US006532426B1

(12) United States Patent
Hooks et al.

(10) Patent No.: US 6,532,426 B1
(45) Date of Patent: Mar. 11, 2003

(54) SYSTEM AND METHOD FOR ANALYZING DIFFERENT SCENARIOS FOR OPERATING AND DESIGNING EQUIPMENT

(75) Inventors: Dean C. Hooks, St. Louis, MO (US); Mark W. Dubuque, St. Louis, MO (US); Keith D. Simon, Maryland Heights, MO (US)

(73) Assignee: The Boeing Company, Seattle, WA (US)

(*) Notice: Subject to any disclaimer, the term of this patent is extended or adjusted under 35 U.S.C. 154(b) by 0 days.

(21) Appl. No.: 09/398,672

(22) Filed: Sep. 17, 1999

(51) Int. Cl.[7] .......................... G06F 17/18; G06F 17/00
(52) U.S. Cl. ............................. 702/81; 700/117; 700/9; 700/49; 700/79; 702/34; 702/185; 703/7; 706/45; 706/46; 714/25; 714/26
(58) Field of Search ............................ 702/34, 81, 181, 702/182, 183, 184, 185; 700/9, 49, 79, 117; 703/7; 714/25, 26; 704/45, 46

(56) References Cited

U.S. PATENT DOCUMENTS

| | | | |
|---|---|---|---|
| 4,965,743 A | * 10/1990 | Malin et al. | 706/45 |
| 4,970,725 A | * 11/1990 | McEnroe et al. | 714/25 |
| 5,014,220 A | 5/1991 | McMann et al. | 706/45 |
| 5,210,704 A | 5/1993 | Husseiny | 702/34 |
| 5,214,577 A | * 5/1993 | Sztipanovits et al. | 700/79 |
| 5,293,323 A | 3/1994 | Doskocil et al. | 702/185 |
| 5,467,265 A | * 11/1995 | Yamada et al. | 700/49 |
| 5,544,308 A | 8/1996 | Giordano et al. | 714/26 |
| 5,566,092 A | 10/1996 | Wang et al. | 702/185 |
| 5,581,663 A | 12/1996 | Zlotin et al. | 706/46 |
| 5,710,723 A | 1/1998 | Hoth et al. | 702/181 |
| 5,742,500 A | * 4/1998 | Irvin | 700/9 |
| 5,748,497 A | * 5/1998 | Scott et al. | 702/181 |
| 6,108,586 A | * 8/2000 | Suzuki et al. | 700/117 |
| 6,195,624 B1 | * 2/2001 | Woodman et al. | 703/7 |

* cited by examiner

*Primary Examiner*—John Barlow
*Assistant Examiner*—John Le
(74) *Attorney, Agent, or Firm*—Alston & Bird LLP

(57) ABSTRACT

An equipment module is analyzed through the use of an array of failure probability values. The array of failure probability values provides an indication of the probability that the equipment module will fail at a plurality of different times. A cost of operating the equipment module is determined by calculating the cost of operating the equipment module at each of the different times using the array of failure probability values, so that the cost calculated at each of the different times is proportional to the probability that the equipment module will fail at the respective time. The cost of operating the equipment module at each of the different times can include a recurring cost value and a non-recurring cost value. An additional probability can be utilized when calculating the cost of operating the equipment module. A maintenance time can be determined, and the costs are calculated in view of maintenance performed at the maintenance time. Different first and second, or first second, third and fourth, scenarios of operating the equipment module can be specified and compared. The present invention advantageously facilitates the selection between numerous scenarios for designing and operating an equipment module by quantifying the relative benefits of the scenarios.

20 Claims, 7 Drawing Sheets

SYSTEM AND METHOD FOR ANALYZING DIFFERENT SCENARIOS FOR OPERATING AND DESIGNING EQUIPMENT

FIELD OF THE INVENTION

The present invention relates generally to quantifying the relative benefits of different scenarios of operating and designing an equipment module and, more particularly, to systems and methods for quantifying the relative benefits of designing and operating an equipment module in accordance with an "operate to failure approach," a "prognostic approach," and a "maintenance approach," as well as quantifying the benefits of varying other aspects relevant to the operation and design of the equipment module.

BACKGROUND OF THE INVENTION

It is common for equipment modules to be designed and operated according to different scenarios. For example, it is conventional for an equipment module, which may be an individual component, a component within a system, or a system of components, to be designed and operated in accordance with one of an "operate to failure approach," a "prognostic approach," or a "maintenance approach."

The maintenance approach refers to a process of replacing or servicing an equipment module at a scheduled interval, such as an interval based on hours of use. The goal of the maintenance approach is to schedule maintenance intervals so that equipment modules are serviced or replaced before they fail, so that failure is avoided. If maintenance intervals are scheduled too frequently, the benefits resulting from the performed maintenance may be offset by excessive maintenance expenses. If maintenance intervals are not scheduled frequent enough, the benefits resulting from the performed maintenance may be offset by excessive failures of equipment modules.

The prognostic approach refers to a process of prognosticating (that is, using present indications as a guide) to predict a failure in advance. The prognostic approach typically requires monitoring of characteristics of the equipment module that can provide an indication of an impending problem with the equipment module. In some cases the equipment module must be designed in a manner that facilitates the monitoring of the characteristic(s) that are of interest. The goal of the prognostic approach depends upon the equipment module of interest. The goal may be to replace an equipment module just prior to a predicted failure of that equipment module. Alternatively, the goal may be to replace or service an equipment module just prior to the equipment module being degraded to a point at which the cost of the replacement or servicing becomes excessive. If too much effort is put into a prognostic approach, the benefits resulting therefrom may be offset or outweighed by excessive expenses associated with the prognosticating. If insufficient efforts are put into a prognostic approach, then the benefits resulting therefrom may be offset or outweighed by excessive failures of equipment modules.

The operate to failure approach refers to operating an equipment module until failure, without using the maintenance approach or the prognostic approach. The equipment module is replaced after it fails.

Numerous decisions that will impact the operation of an equipment module are made during the course of designing the equipment module. For example, it is common for spare equipment modules to be designed into a system. A spare equipment module is typically redundant to a non-spare equipment module and is operative to function in a manner so as to "back up" or operate in the place of the non-spare equipment module when the non-spare equipment module becomes inoperative.

Whereas the general concepts of the operate to failure approach, the prognostic approach, and the maintenance approach are well known, and it is known to prolong operation of a system such as by incorporating spares into the system, a problem exists because it can be difficult to select between these scenarios when designing or operating an equipment module. It can be difficult to quantify the relative benefits of these scenarios because numerous factors must be taken into consideration. For example, different equipment modules have numerous characteristics and associated costs that should be considered. As a result, designers and operators of equipment modules often do not optimally select from the operate to failure approach, the prognostic approach, the maintenance approach or other scenarios, such that it is common for the design and operation of equipment modules to be less than optimal.

SUMMARY OF THE INVENTION

The present invention solves the above problems, and other problems, by providing systems and methods for quantifying the relative benefits of different scenarios of operating and designing equipment modules. More specifically, the present invention provides, in various combinations, systems and methods for quantifying the relative benefits of designing and operating an equipment module or system in accordance with the operate to failure approach, the prognostic approach, and the maintenance approach, as well as quantifying the benefits of other scenarios, such as incorporating different numbers of spare equipment modules into a system.

In accordance with one aspect of the present invention, an equipment module is analyzed through the use of an array of failure probability values, which can more specifically be in the form of a failure probability curve. The array of failure probability values provides an indication of the probability that the equipment module will fail at a plurality of different times. A cost of operating the equipment module is determined by calculating the cost of operating the equipment module at each of the different times using the array of failure probability values, so that the cost calculated at each of the different times is proportional to the probability that the equipment module will fail at the respective time.

In accordance with another aspect of the present invention, the cost of operating the equipment module at each of the different times includes a recurring cost value and a non-recurring cost value. The recurring cost value can include, but is not limited to, the cost of the equipment module, costs incurred due to failure of the equipment module, costs of prognostic hardware for the equipment module, and costs of prognostic procedures for the equipment module. The non-recurring cost value can include, but is not limited to, the costs of designing prognostic capabilities into the equipment module.

In accordance with another aspect of the present invention, at least one additional probability is utilized when calculating the cost of operating the equipment module. The additional probability can include, but is not limited to, a probability that the equipment module will be incorrectly identified as needing to be refurbished, a probability that the equipment module will be incorrectly identified as needing to be replaced, a probability that no notification of a necessary refurbishment will be provided for the equipment module, such that the equipment module fails without warning, and a probability that no notification of a necessary replacement will be provided for the equipment module, such that the equipment module fails without warning.

In accordance with another aspect of the present invention, a maintenance time indicates a time at which maintenance should be performed on the equipment module. The plurality of different times is a series of times that are designated as a first time through a last time, respectively, and the maintenance time is between the first time and the last time. Additionally, the calculated costs are a series of first costs designated as a first cost through a last cost. The series of costs respectively correspond to the series of times, and the costs are calculated so that at least some of the costs, which correspond to times after the maintenance time, are proportional to probabilities, which are provided by the array of failure probability values, that correspond to times prior to the maintenance time.

In accordance with another aspect of the present invention, the different times are a series of times, so that the calculated costs are a series of first costs that correspond to the series of times. Further, the maintenance time for the equipment module is identified by calculating a series of second costs that respectively correspond to the series of times. Each second cost is calculated by dividing a respective sum by the respective time corresponding to the second cost. For each second cost, the respective sum includes at least the first cost that corresponds to the respective time of the second cost. The maintenance time is the time of the series of times that corresponds to the smallest second cost of the series of second costs.

In accordance with another aspect of the present invention, different first and second scenarios of operating the equipment module are specified. The cost of operating the equipment module in accordance with the first and second scenarios are determined in the manner described above. Thereafter, the difference between the cost of operating the equipment module in accordance with the first and second scenarios is determined. The first and second scenarios can be selected from a group consisting of an operate to failure approach, a prognostic approach, and a maintenance approach. Alternatively, the first and second scenarios are defined by at least one variable, and the specifying of the first scenario comprises specifying a first value for the variable and the specifying of the second scenario comprises specifying a second value for the variable that is different from the first value. The variable can be, but is not limited to, the cost of the equipment module, costs incurred due to failure of the equipment module, the number of equipment modules, the total amount of time that a system incorporating the equipment module is expected to operate in the entire life of the system, the average length of time that the system incorporating the equipment module operates, wherein the system operates intermittently, the total number of the systems that will be produced, the cost of prognostic hardware for the equipment module, the cost of prognostic procedures for the equipment module, the cost of designing prognostic capabilities into the equipment module, a probability that the equipment module will be incorrectly identified as needing to be refurbished, a probability that the equipment module will be incorrectly identified as needing to be replaced, a probability that no notification of a necessary refurbishment will be provided for the equipment module, such that the equipment module fails without warning, and a probability that no notification of a necessary replacement will be provided for the equipment module, such that the equipment module fails without warning.

In accordance with another aspect of the present invention, in addition to calculating the costs for a first and second scenario, the costs are also calculated for second and third scenarios. A first value is determined that quantifies the difference between the cost of operating the equipment module in accordance with the first scenario and the cost of operating the equipment module in accordance with the second scenario, a second value is determined that quantifies the difference between the cost of operating the equipment module in accordance with the third scenario and the cost of operating the equipment module in accordance with the fourth scenario, and the difference between the first and second values is quantified.

In accordance with another aspect of the present invention, a program module is operative to perform the methods of the present invention when executed by a computer.

The present invention advantageously facilitates the selection between numerous scenarios for designing and operating an equipment module by quantifying the relative benefits of the scenarios.

DETAILED DESCRIPTION OF THE INVENTION

Figure 1:
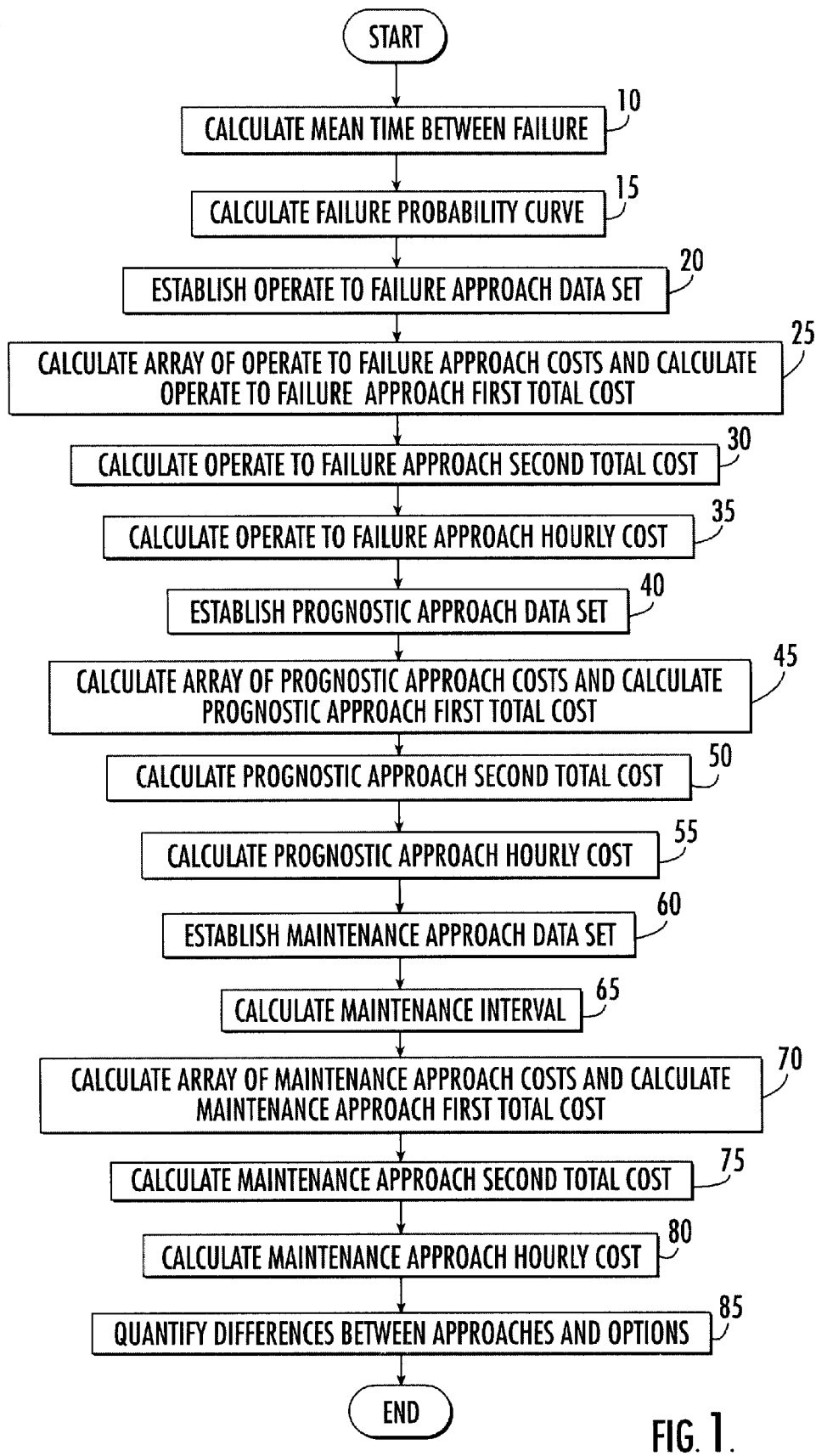
FIG. 1 presents a flow chart illustrating high level operations performed in accordance with an exemplary embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

The present invention comprises a method, which is preferably incorporated into a software module as will be discussed in greater detail below, that operates to quantify the relative benefits of different scenarios of operating and designing an equipment module. The equipment module can be an entire system, or the equipment module can be an isolated component or a component that is within a system. The different scenarios that are modeled by the method of the present invention include, but are not limited to, an Operate to Failure Approach, a Prognostic Approach, and a Maintenance Approach, each of which is described in the Background of the Invention section of the disclosure.

More specifically, in accordance with one embodiment of the present invention, the method of the present invention functions to identify the relative benefits of prognostically monitoring an equipment module or incorporating on-board prognostics into an equipment module, incorporating spare or redundant equipment modules, and establishing a maintenance schedule for an equipment module.

In accordance with the exemplary embodiment of the present invention, the method performs numerous calculations to determine the relative benefits of the different approaches for designing and operating an equipment module. The method utilizes numerous inputs and a failure probability curve in the calculations. The failure probability curve identifies or estimates average failure trends of the equipment module. In addition, the inputs utilized by the method of the present invention, for which values are provided by a user of the method, are presented in the following Table 1, which is illustrative of a User-Defined Data Set, in accordance with the exemplary embodiment of the present invention. Each input presented in the left column of Table 1 is briefly described in the corresponding row of the second column of the table.

TABLE 1

User-Defined Data Set

| Inputs | Description of Inputs |
|---|---|
| EQUIPMENT MODULE COST | The cost to replace the equipment module, which is typically the purchase price of the equipment module. |
| REFURBISH OPERATING EQUIPMENT MODULE COST | The cost of refurbishing an equipment module that has not failed. After the refurbishing, the equipment module has approximately the operational life of a new equipment module. |
| REFURBISH FAILED EQUIPMENT MODULE COST | The cost of refurbishing an equipment module that has failed. After the refurbishing, the equipment module has approximately the operational life of a new equipment module. |
| OPERATIONAL FAILURE COST | The costs incurred due to failure of the equipment module that are not included in REFURBISH FAILED EQUIPMENT MODULE COST. For example, this may include costs associated with the unavailability of or inoperativeness of the failed equipment module. |
| RECURRING PROGNOSTICS COST | The cost associated with prognostic hardware, if any, and prognostic procedures for a particular equipment module. |
| NON-RECURRING PROGNOSTICS COST | Prognostic related costs other than RECURRING PROGNOSTICS COST. For example, NON-RECURRING PROGNOSTICS COST includes the cost of deisgning prognostic capabilities into a type of equipment module or the initial establishment of a prognostic procedure that is to be implemented for a type of equipment module. |
| SPARE EQUIPMENT MODULES | The number of equipment modules that are built into a system but that are not initially intended to be in service. SPARE EQUIPMENT MODULES are redundant to a primary equipment module that is in service, and a SPARE EQUIPMENT MODULE is capable of serving as a substitute to the primary equipment upon failure of the primary equipment module, so that the system can remain in service. |
| NON-SPARE EQUIPMENT MODULES | The number of equipment modules in the system, not including SPARE EQUIPMENT MODULES. |
| FALSE ALARM PROBABILITY | The probability that an equipment module that is being handled in accordance with the Prognostic Approach will be identified as needing to be refurbished or replaced, and that the identification of the needed servicing is not correct. |
| MISSED PREDICTION PROBABILITY | The probability that no notification of a necessary refurbishment or replacement will be provided for an equipment module that is being handled in accordance with the Prognostic Approach, such that the equipment module fails without warning. |
| RAW FAILURE DATA | A collection of information regarding the time of failure of each of the equipment modules of a suitable group of equipment modules of the type of interest, as will be discussed in greater detail below. |
| AVERAGE SYSTEM LIFE HOURS | The total number of hours that the system incorporating the equipment module of interest is expected to operate in the entire life of the system. |

TABLE 1-continued

User-Defined Data Set

| Inputs | Description of Inputs |
| --- | --- |
| AVERAGE OPERATIONAL CYCLE | The average length of time in hours that the system incorporating the equipment module of interest operates, such as in the case of a system that operates intermittently. |
| TOTAL SYSTEMS PRODUCED | The total number of systems, of the type of interest, that will be produced. |

Inputs and outputs of the method of the present invention will be referred to throughout the Detailed Description of the Invention section of this disclosure by their respective name. Throughout the Detailed Description of the Invention section of this disclosure, the names of inputs and outputs are printed in all upper-case letters, and when an input or output is referred to in the context of a calculation it is to be understood that the value of the input is used in the calculation and the value of the output is the result of the calculation. Further, in some cases an output may be fedback to serve an input, in which case that output may be referred to as an input.

As mentioned above, the RAW FAILURE DATA is a collection of information regarding the time of failure of each of the equipment modules of a suitable group of equipment modules of the type of interest. As discussed in greater detail below, the method of the present invention is preferably capable of producing a FAILURE PROBABILITY CURVE from the RAW FAILURE DATA. The FAILURE PROBABILITY CURVE is a normalized failure probability curve that indicates the percentage chance of an equipment module failing at a given time. The group of the equipment modules from which the RAW FAILURE DATA is collected is preferably a group of equipment modules that are like the equipment module of interest, and the group is preferably sufficiently large so as to provide for the development of a FAILURE PROBABILITY CURVE that accurately indicates the probability of failure of the equipment module of interest. The FAILURE PROBABILITY CURVE can be thought of as, or described more generally as, an array of failure probability values.

An input referred to as CORRECT PREDICTIONS is preferably used in place of MISSED PREDICTION PROBABILITY, which is identified in Table 1. MISSED PREDICTION PROBABILITY is equal to one minus CORRECT PREDICTIONS.

A user of the method of the present invention initially establishes a value for each of the inputs of the User-Defined Data Set illustrated in Table 1. In addition, the method of the present invention establishes numerous method-defined data sets that include inputs and their associated values from the User-Defined Data Set, as will be discussed in greater detail below.

Operations of the Method

High Level Operations

FIG. 1 presents a flow chart illustrating High Level Operations performed by the method of one exemplary embodiment of the present invention. At block 10, MEAN TIME BETWEEN FAILURE is calculated. MEAN TIME BETWEEN FAILURE is determined from the RAW FAILURE DATA of the User-Defined Data Set illustrated by Table 1. MEAN TIME BETWEEN FAILURE is equal to the time at which fifty percent of the equipment modules of the group of equipment modules that are source of the RAW FAILURE DATA have failed.

Figure 6:
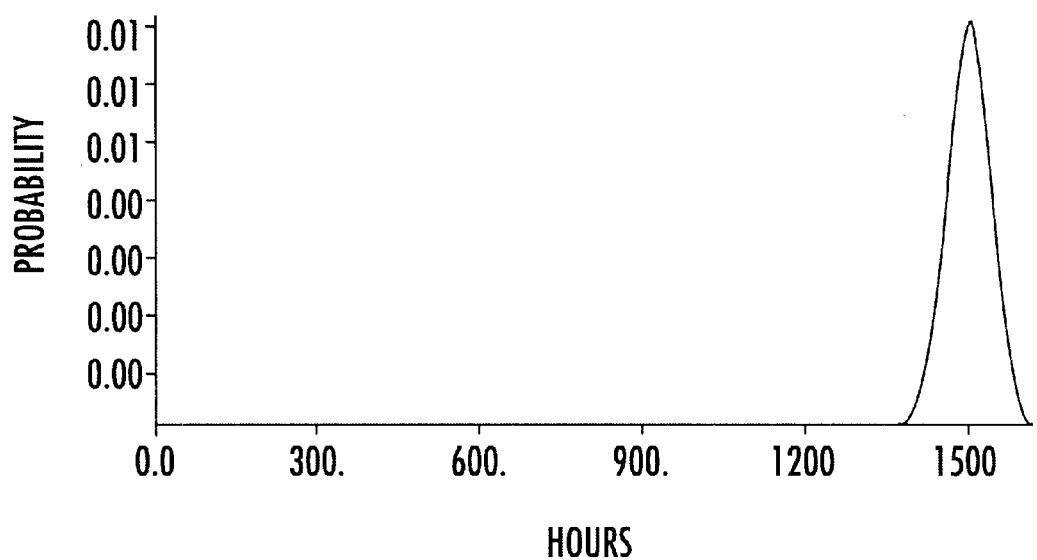
FIG. 6 illustrates a failure probability curve that is utilized in accordance with operations of the present invention, in accordance with a non-limiting example of the present invention.

At block 15, the FAILURE PROBABILITY CURVE, which is discussed in detail above, is established. The FAILURE PROBABILITY CURVE is preferably a normalized curve that is developed from the RAW FAILURE DATA of the User-Defined Data Set. A non-limiting example of a FAILURE PROBABILITY CURVE is illustrated in FIG. 6. The FAILURE PROBABILITY CURVE is defined so as to include multiple distribution points that are evenly spaced along the x-axis of the FAILURE PROBABILITY CURVE. More specifically, the FAILURE PROBABILITY CURVE has X distribution points that are designated DISTRIBUTION POINT O through DISTRIBUTION POINT X-1. In accordance with one embodiment of the present invention, there are one thousand distribution points, although the curve can include more or less points. Those skilled in the art will be able to produce the FAILURE PROBABILITY CURVE from the RAW FAILURE DATA of the User-Defined Data Set.

Whereas the FAILURE PROBABILITY CURVE and MEAN TIME BETWEEN FAILURE are preferably calculated by the method of the present invention, it is also within the scope of the present invention for the method not to be supplied with the RAW FAILURE DATA, such as when suitable RAW FAILURE DATA is not available for an equipment module of interest. In situations in which suitable RAW FAILURE DATA is not available, it is preferred for the user of the method of the present invention to predict and input a value for MEAN TIME BETWEEN FAILURE that will be used by the method of the present invention. Of course, it is preferred for the user to be sufficiently knowledgeable so as to be able to predict a MEAN TIME BETWEEN FAILURE that is reasonably likely to be reasonably accurate. It is also preferred in situations in which suitable RAW FAILURE DATA is not available for the user to select a suitable theoretical FAILURE PROBABILITY CURVE that is believed to best represent the probability of failure for the equipment module of interest that will be used by the method of the present invention.

As will be discussed in greater detail below, in accordance with the exemplary embodiment of the present invention, the method of the present invention is embodied in a software module that is operable on various types of computer systems. It is preferred for the software module to be operative to make available to the user of the software module numerous different theoretical FAILURE PROBABILITY CURVES, so that in the event that suitable RAW FAILURE DATA is not available the user may select the most appropriate one of the presented theoretical FAILURE PROBABILITY CURVES. In this regard, a selected theoretical FAILURE PROBABILITY CURVE is utilized by the software module of the present invention in the same way as a FAILURE PROBABILITY CURVE developed from RAW FAILURE DATA.

Those skilled in the art will appreciate that acceptable examples of theoretical FAILURE PROBABILITY CURVES include, but are not limited to, the Gaussian distribution curve and the Rayleigh distribution curve. The Gaussian distribution curve is defined by the following function:

$$f(x)=1/(\operatorname{sqrt}(\text{variance}*2*\text{pi}))*e\char`\^(-(x-\text{mean})\char`\^2/(2*\text{variance})).$$

purpose of providing a framework from which the present invention can be readily understood, as opposed to being required for implementation of the present invention.

The Operate to Failure Approach Data Set is illustrated below by Table 2, in accordance with the exemplary embodiment of the present invention. For each input or output presented in the left column of Table 1, the value corresponding thereto is identified in the corresponding row of the second column.

TABLE 2

Operate to Failure Approach Data Set

| Inputs and Outputs | Values |
| --- | --- |
| EQUIPMENT MODULE COST | As specified by User-Defined Data Set. |
| REFURBISH OPERATING EQUIPMENT MODULE COST | As specified by User-Defined Data Set. |
| REFURBISH FAILED EQUIPMENT MODULE COST | As specified by User-Defined Data Set. |
| OPERATIONAL FAILURE COST | As specified by User-Defined Data Set. |
| RECURRING PROGNOSTICS COST | Zero |
| NON-RECURRING PROGNOSTICS COST | Zero |
| SPARE EQUIPMENT MODULES | As specified by User-Defined Data Set. |
| NON-SPARE EQUIPMENT MODULES | As specified by User-Defined Data Set. |
| FALSE ALARM PROBABILITY | Zero percent |
| MISSED PREDICTION PROBABILITY | One hundred percent |
| MEAN TIME BETWEEN FAILURE | As specified with reference to block 10 of FIG. 1. |
| FAILURE PROBABILITY CURVE | As specified with reference to block 15 of FIG. 1. |
| MAINTENANCE INTERVAL | Infinity |
| AVERAGE SYSTEM LIFE HOURS | As specified by User-Defined Data Set. |
| AVERAGE OPERATIONAL CYCLE | As specified by User-Defined Data Set. |
| TOTAL SYSTEMS PRODUCED | As specified by User-Defined Data Set. |
| ARRAY OF OPERATE TO FAILURE APPROACH COSTS | To be calculated. |
| OPERATE TO FAILURE APPROACH FIRST TOTAL COST (a/k/a FIRST TOTAL COST) | To be calculated. |
| OPERATE TO FAILURE APPROACH SECOND TOTAL COST (a/k/a SECOND TOTAL COST) | To be calculated. |
| OPERATE TO FAILURE APPROACH HOURLY COST | To be calculated. |

The Rayleigh distribution curve is defined by the following function:

$$f(x)=(x/\text{variance})*e\char`\^((-x\char`\^2)/(2*\text{variance}))$$

At block 20 of the flow chart of FIG. 1, the method also establishes an Operate to Failure Approach Data Set. As will be discussed in greater detail below, MEAN TIME BETWEEN FAILURE and the FAILURE PROBABILITY CURVE can be characterized as inputs that become part of multiple data sets from which inputs are obtained for performing calculations that are carried out by the method of the present invention. Whereas some inputs, such as MEAN TIME BETWEEN FAILURE and the FAILURE PROBABILITY CURVE, are described hereinbelow as being included in multiple data sets, those skilled in the art will appreciate that it may be preferred for the present invention to be practiced without redundantly storing inputs in multiple data sets. Whereas the data sets described herein can be characterized as being within the scope of an embodiment of the present invention, other embodiments of the present invention need not include data sets exactly as they are described herein, in which case the data sets described herein can be characterized as being presented for the Whereas some of the inputs of the Operate to Failure Approach Data Set illustrated by Table 2 have been described with reference to the User-Defined Data Set illustrated by Table 1, the other inputs and outputs of the Operate to Failure Approach Data Set will be described below. Values of some of the inputs of the Operate to Failure Approach Data Set are calculated at blocks 25, 30 and 35 of FIG. 1.

At block 25 of FIG. 1, the values of the ARRAY OF OPERATE TO FAILURE APPROACH COSTS and the value of OPERATE TO FAILURE APPROACH FIRST TOTAL COST are calculated. The ARRAY OF OPERATE TO FAILURE APPROACH COSTS has X values that are designated VALUE 0 through VALUE X-1. The values of the ARRAY OF OPERATE TO FAILURE APPROACH COSTS and the value of OPERATE TO FAILURE APPROACH FIRST TOTAL COST are calculated in accordance with Non-Hourly Cost Calculating Operations, which are described below with reference to the flow chart illustrated in FIGS. 2A and 2B. As will become apparent, the Non-Hourly Cost Calculating Operations are performed for multiple different data sets.

Unless specified otherwise, the inputs to the Non-Hourly Cost Calculating Operations performed at block 25 of FIG.

1 are from the Operate to Failure Approach Data Set, which is illustrated by Table 2. The generic outputs of the Non-Hourly Cost Calculating Operations are COST ARRAY and TOTAL COST. When the Non-Hourly Cost Calculating Operations are completed in the furtherance of block 25 of FIG. 1, the ARRAY OF OPERATE TO FAILURE APPROACH COSTS is set equal to the COST ARRAY, and the OPERATE TO FAILURE APPROACH FIRST TOTAL COST is set equal to TOTAL COST.

At block 30 of FIG. 1, OPERATE TO FAILURE APPROACH SECOND TOTAL COST is calculated in accordance with the Non-Hourly Cost Calculating Operations, which are described below with reference to the flow chart illustrated in FIGS. 2A and 2B. Unless specified otherwise, the inputs to the Non-Hourly Cost Calculating Operations performed at block 30 of FIG. 1 are from the Operate to Failure Approach Data Set illustrated by Table 2, except that EQUIPMENT MODULE COST is equal to zero for the calculations performed at block 30. When the Non-Hourly Cost Calculating Operations are completed in the furtherance of block 30 of FIG. 1, the OPERATE TO FAILURE APPROACH SECOND TOTAL COST is set equal to TOTAL COST, which is output from the Non-Hourly Cost Calculating Operations.

At block 35, OPERATE TO FAILURE TO APPROACH HOURLY COST is calculated in accordance with Hourly Cost Calculating Operations, which are described below with reference to FIG. 3. As will become apparent, the Hourly Cost Calculating Operations are performed for multiple different data sets. Unless specified otherwise, the inputs to the Hourly Cost Calculating Operations performed at block 35 of FIG. 1 are from the Operate to Failure Approach Data Set illustrated by Table 2. For purposes of performing the Hourly Cost Calculating Operations at block 35 of FIG. 1, OPERATE TO FAILURE APPROACH FIRST TOTAL COST, which is from the Operate to Failure Approach Data Set illustrated by Table 2, is also known as FIRST TOTAL COST. Similarly, for purposes of performing the Hourly Cost Calculating Operations at block 35 of FIG. 1, OPERATE TO FAILURE APPROACH SECOND TOTAL COST, which is from the. Operate to Failure Approach Data Set illustrated by Table 2, is also known as SECOND TOTAL COST. The generic output of the Hourly Cost Calculating Operations is HOURLY COST. When the Hourly Cost Calculating Operations are completed at block 35 of FIG. 1, OPERATE TO FAILURE TO APPROACH HOURLY COST is set equal to HOURLY COST.

At block 40 of FIG. 1, a Prognostic Approach Data Set is established, and that data set is illustrated in Table 3, in accordance with the exemplary embodiment of the present invention.

TABLE 3

Prognostic Approach Data Set

| Inputs and Outputs | Values |
| --- | --- |
| EQUIPMENT MODULE COST | As specified by User-Defined Data Set. |
| REFURBISH OPERATING EQUIPMENT MODULE COST | As specified by User-Defined Data Set. |
| REFURBISH FAILED EQUIPMENT MODULE COST | As specified by User-Defined Data Set. |
| OPERATIONAL FAILURE COST | As specified by User-Defined Data Set. |
| RECURRING PROGNOSTICS COST | As specified by User-Defined Data Set. |
| NON-RECURRING PROGNOSTICS COST | As specified by User-Defined Data Set. |
| SPARE EQUIPMENT MODULES | As specified by User-Defined Data Set. |
| NON-SPARE EQUIPMENT MODULES | As specified by User-Defined Data Set. |
| FALSE ALARM PROBABILITY | As specified by User-Defined Data Set. |
| MISSED PREDICTION PROBABILITY | As specified by User-Defined Data Set. |
| MEAN TIME BETWEEN FAILURE | As specified with reference to block 10 of FIG. 1. |
| FAILURE PROBABILITY CURVE | As specified with reference to block 15 of FIG. 1. |
| MAINTENANCE INTERVAL | Infinity |
| AVERAGE SYSTEM LIFE HOURS | As specified by User-Defined Data Set. |
| AVERAGE OPERATIONAL CYCLE | As specified by User-Defined Data Set. |
| TOTAL SYSTEMS PRODUCED | As specified by User-Defined Data Set. |
| ARRAY OF PROGNOSTIC APPROACH COSTS | To be calculated. |
| PROGNOSTIC APPROACH FIRST TOTAL COST (a/k/a FIRST TOTAL COST) | To be calculated. |
| PROGNOSTIC APPROACH SECOND TOTAL COST (a/k/a SECOND TOTAL COST) | To be calculated. |
| PROGNOSTIC APPROACH HOURLY COST | To be calculated. |

Whereas some of the inputs of the Prognostic Approach Data Set illustrated by Table 3 have been described with reference to the User-Defined Data Set illustrated by Table 1, the other inputs and outputs of the Prognostic Approach Data Set will be described below. Values of some of the inputs of the Prognostic Approach Data Set are calculated at blocks 45, 50 and 55 of FIG. 1.

At block 45 of FIG. 1, the ARRAY OF PROGNOSTIC APPROACH COSTS and PROGNOSTIC APPROACH FIRST TOTAL COST are calculated. The ARRAY OF PROGNOSTIC APPROACH COSTS has X values that are designated VALUE 0 through VALUE X-1. The ARRAY OF PROGNOSTIC APPROACH COSTS and PROGNOSTIC APPROACH FIRST TOTAL COST are calculated in accordance with the Non-Hourly Cost Calculating Operations, which are described below with reference to the flow chart illustrated in FIGS. 2A and 2B. Unless specified otherwise, the inputs to the Non-Hourly Cost Calculating Operations performed at block 45 of FIG. 1 are from the Prognostic Approach Data Set, which is illustrated by Table 3. As mentioned above, the generic outputs of the Non-Hourly Cost Calculating Operations are COST ARRAY and TOTAL COST. When the Non-Hourly Cost Calculating Operations are completed in the furtherance of block 45 of FIG. 1, the ARRAY OF PROGNOSTIC APPROACH COSTS is set equal to the COST ARRAY, and PROGNOSTIC APPROACH FIRST TOTAL COST is set equal to TOTAL COST.

At block 50 of FIG. 1, PROGNOSTIC APPROACH SECOND TOTAL COST is calculated in accordance with the. Non-Hourly Cost Calculating Operations, which are described below with reference to the flow chart illustrated in FIGS. 2A and 2B. Unless specified otherwise, the inputs to the Non-Hourly Cost Calculating Operations performed at block 50 of FIG. 1 are from the Prognostic Approach Data Set illustrated by Table 3, except that both EQUIPMENT MODULE COST and RECURRING PROGNOSTICS COST are set equal to zero for the calculations performed at block 50. When the Non-Hourly Cost Calculating Operations are completed in the furtherance of block 50 of FIG. 1, PROGNOSTIC APPROACH SECOND TOTAL COST is set equal to TOTAL COST, which is output from the Non-Hourly Cost Calculating Operations.

At block 55, PROGNOSTIC APPROACH HOURLY COST is calculated in accordance with Hourly Cost Calculating Operations, which are described below with reference to FIG. 3. Unless specified otherwise, the inputs to the Hourly Cost Calculating Operations performed at block 55 of FIG. 1 are from the Prognostic Approach Data Set illustrated by Table 3. For purposes of performing the Hourly Cost Calculating Operations at block 55 of FIG. 1, PROGNOSTIC APPROACH FIRST TOTAL COST, which is from the Prognostic Approach Data Set illustrated by Table 3, is also known as FIRST TOTAL COST. Similarly, for purposes of performing the Hourly Cost Calculating Operations associated with block 55 of FIG. 1, PROGNOSTIC APPROACH SECOND TOTAL COST, which is from the Prognostic Approach Data Set illustrated by Table 3, is also known as SECOND TOTAL COST. When the Hourly Cost Calculating Operations are completed at block 55 of FIG. 1, PROGNOSTIC APPROACH HOURLY COST is set equal to HOURLY COST, which is output from the Hourly Cost Calculating Operations.

At block 60 of FIG. 1, a Maintenance Approach Data Set is established, and that data set is illustrated in Table 4, in accordance with the exemplary embodiment of the present invention.

TABLE 4

Maintenance Approach Data Set

| Inputs and Outputs | Values |
| --- | --- |
| EQUIPMENT MODULE COST | As specified by User-Defined Data Set. |
| REFURBISH OPERATING EQUIPMENT MODULE COST | As specified by User-Defined Data Set. |
| REFURBISH FAILED EQUIPMENT MODULE COST | As specified by User-Defined Data Set. |
| OPERATIONAL FAILURE COST | As specified by User-Defined Data Set. |
| RECURRING PROGNOSTICS COST | Zero |
| NON-RECURRING PROGNOSTICS COST | Zero |
| SPARE EQUIPMENT MODULES | As specified by User-Defined Data Set. |
| NON-SPARE EQUIPMENT MODULES | As specified by User-Defined Data Set. |
| FALSE ALARM PROBABILITY | Zero percent |
| MISSED PREDICTION PROBABILITY | One hundred percent |
| MEAN TIME BETWEEN FAILURE | As specified with reference to block 10 of FIG. 1. |
| FAILURE PROBABILITY CURVE | As specified with reference to block 15 of FIG. 1. |
| MAINTENANCE INTERVAL | To be calculated. |
| AVERAGE SYSTEM LIFE HOURS | As specified by User-Defined Data Set. |
| AVERAGE OPERATIONAL CYCLE | As specified by User-Defined Data Set. |
| TOTAL SYSTEMS PRODUCED | As specified by User-Defined Data Set. |
| ARRAY OF MAINTENANCE APPROACH COSTS | To be calculated. |
| MAINTENANCE APPROACH FIRST TOTAL COST (a/k/a FIRST TOTAL COST) | To be calculated. |
| MAINTENANCE APPROACH SECOND TOTAL COST (a/k/a SECOND TOTAL COST) | To be calculated. |
| MAINTENANCE APPROACH HOURLY COST | To be calculated. |

Whereas some of the inputs of the Maintenance Approach Data Set illustrated in Table 2 have been described with reference to the User-Defined Data Set illustrated by Table 1, the other inputs of the Maintenance Approach Data Set will be described below. Values of some of the inputs of the Maintenance Approach Data Set are calculated at blocks 65, 70, 75 and 80.

At block 65 of FIG. 1, MAINTENANCE INTERVAL of the Maintenance Approach Data Set illustrated by Table 4 is calculated in accordance with Maintenance Interval Calculating Operations, as is described in detail below with reference to FIG. 4.

At block 70 of FIG. 1, the ARRAY OF MAINTENANCE APPROACH COSTS and MAINTENANCE APPROACH FIRST TOTAL COST are calculated. The ARRAY OF MAINTENANCE APPROACH COSTS has X values that are designated VALUE 0 through VALUE X-1. The ARRAY OF MAINTENANCE APPROACH COSTS and MAINTENANCE APPROACH FIRST TOTAL COST are calculated in accordance with the Non-Hourly Cost Calculating Operations, which are described below with reference to the flow chart illustrated in FIGS. 2A and 2B. Unless specified otherwise, the inputs to the Non-Hourly Cost Calculating Operations performed at block 70 of FIG. 1 are from the Maintenance Approach Data Set, which is illustrated by Table 4. As mentioned above, the generic outputs of the Non-Hourly Cost Calculating Operations are COST ARRAY and TOTAL COST. When the Non-Hourly Cost Calculating Operations are completed at block 70 of FIG. 1, the ARRAY OF MAINTENANCE APPROACH COSTS is set equal to the COST ARRAY, and MAINTENANCE APPROACH FIRST TOTAL COST is set equal to TOTAL COST.

At block 75 of FIG. 1, MAINTENANCE APPROACH SECOND TOTAL COST is calculated in accordance with the Non-Hourly Cost Calculating Operations, which are described below with reference to the flow chart illustrated in FIGS. 2A and 2B. Unless specified otherwise, the inputs to the Non-Hourly Cost Calculating Operations performed at block 75 of FIG. 1 are from the Maintenance Approach Data Set illustrated by Table 4, except that EQUIPMENT MODULE COST is set equal to zero. When the Non-Hourly Cost Calculating Operations are completed at block 75 of FIG. 1, MAINTENANCE APPROACH SECOND TOTAL COST is set equal to TOTAL COST, which is output from the Non-Hourly Cost Calculating Operations.

At block 80, MAINTENANCE APPROACH HOURLY COST is calculated in accordance with Hourly Cost Calculating Operations, which are described below with reference to FIG. 3. Unless-specified otherwise, the inputs to the Hourly Cost Calculating Operations performed at block 80 of FIG. 1 are from the Maintenance Approach Data Set illustrated by Table 4. For purposes of performing the Hourly Cost Calculating Operations at block 80 of FIG. 1, MAINTENANCE APPROACH FIRST TOTAL COST, which is from the Maintenance Approach Data Set illustrated by Table 4, is also known as FIRST TOTAL COST. Similarly, for purposes of performing the Hourly Cost Calculating Operations at block 80 of FIG. 1, MAINTENANCE APPROACH SECOND TOTAL COST, which is from the Maintenance Approach Data Set illustrated by Table 4, is also known as SECOND TOTAL COST. When the Hourly Cost Calculating Operations are completed at block 80 of FIG. 1, MAINTENANCE APPROACH HOURLY COST is set equal to HOURLY COST, which is output from the Hourly Cost Calculating Operations.

At block 85 of FIG. 1, differences between the Operate to Failure Approach, Prognostic Approach and Maintenance Approach, and differences between other options or approaches, are quantified in accordance with Benefit Calculating Operations that are discussed below.

Non-Hourly Cost Calculating Operations

Figure 2A:
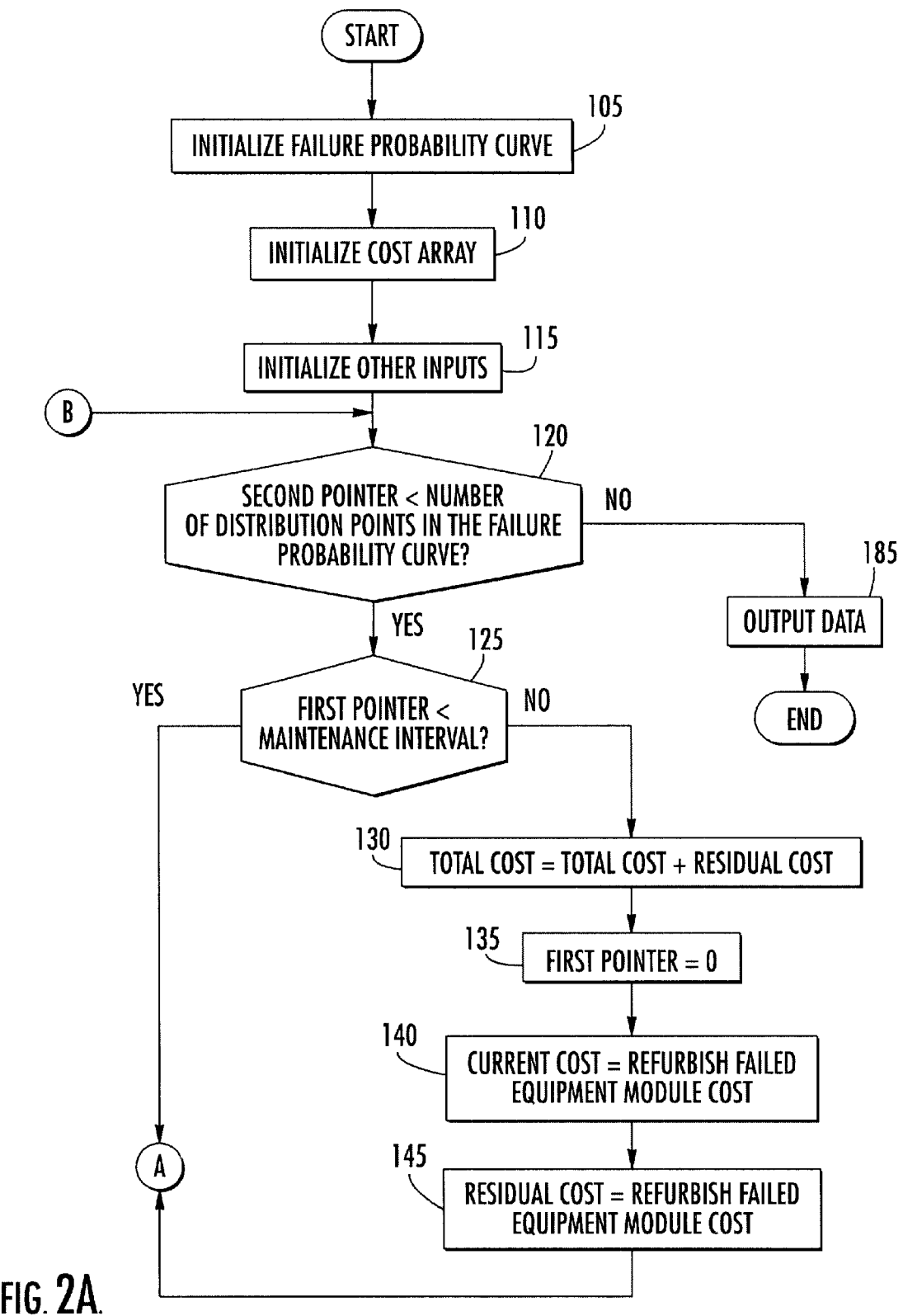
FIGS. 2A and 2B present a flow chart illustrating Non-Hourly Cost Calculating Operations performed for calculating costs associated with an Operate to Failure Approach, a Prognostic Approach, and a Maintenance Approach, in accordance with the exemplary embodiment of the present invention.
Figure 2B:
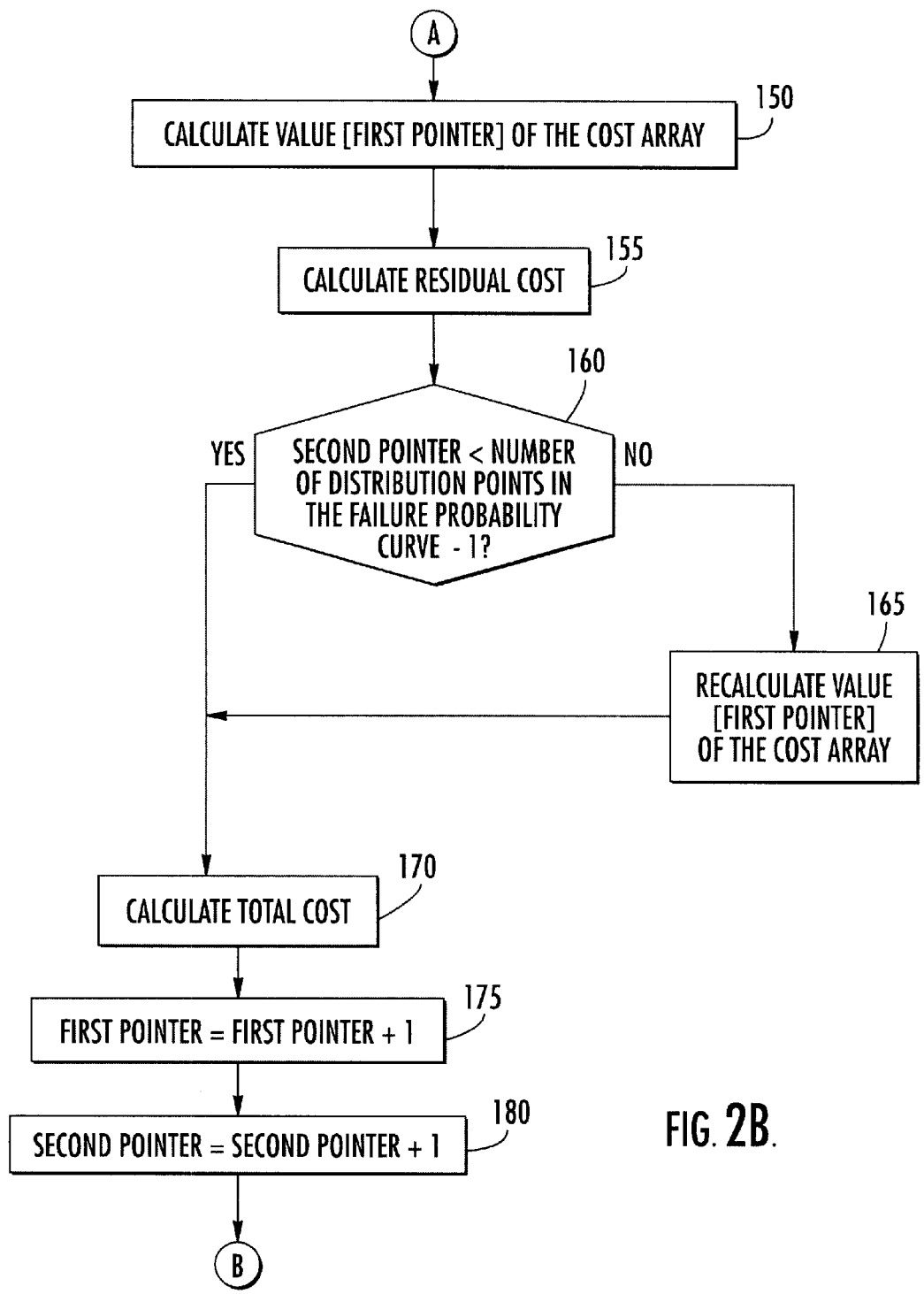

FIGS. 2A and 2B present a flow chart illustrating the Non-Hourly Cost Calculating Operations that are performed to calculate the COST ARRAY and TOTAL COST at blocks 25, 30, 45, 50, 70 and 75 of FIG. 1, in accordance with the exemplary embodiment of the present invention. More specifically, the Non-Hourly Cost Calculating Operations are performed to calculate FIRST TOTAL COST at blocks 25, 45 and 70, and SECOND TOTAL COST at blocks 30, 50 and 75. The difference between FIRST TOTAL COST and SECOND TOTAL COST is that SECOND TOTAL COST is always calculated with values of zero for EQUIPMENT MODULE COST and RECURRING PROGNOSTICS COST. Therefore, SECOND TOTAL COST does not include the initial purchase cost factors included in FIRST TOTAL COST. At block 240 (FIG. 3), which is discussed in greater detail below, FIRST TOTAL COST and SECOND TOTAL COST are used to calculate an average cost.

Referring to the Non-Hourly Cost Calculating Operations more specifically, at block 105 of FIG. 2A the FAILURE PROBABILITY CURVE is initialized. As described above, distribution points are evenly spaced along the x-axis of the FAILURE PROBABILITY CURVE, and there are X distribution points that are designated DISTRIBUTION POINT 0 through DISTRIBUTION POINT X-1. The initialization that occurs at block 105 includes the initialization of a pointer, which is referred to herein as FIRST POINTER. FIRST POINTER is operative to sequentially identify distribution points of the FAILURE PROBABILITY CURVE.

At block 105, FIRST POINTER is set equal to zero. As will be discussed in greater detail below, FIRST POINTER is incremented during the Non-Hourly Cost Calculating Operations such that FIRST POINTER is used to identify DISTRIBUTION POINT 0 through DISTRIBUTION POINT X-1. For example, DISTRIBUTION POINT [FIRST POINTER] designates DISTRIBUTION POINT 0 while FIRST POINTER is equal to zero. As an additional example, DISTRIBUTION POINT [FIRST POINTER] designates DISTRIBUTION POINT X-1 while FIRST POINTER is equal to X-1.

At block 110, the COST ARRAY is initialized. The COST ARRAY has X values that are designated VALUE 0 through VALUE X-1. As eluded to above, just subsequent to the completion of all of the operations performed at block 25 (FIG. 1), VALUE 0 through VALUE X-1 of the COST ARRAY are respectively equal to VALUE 0 through VALUE X-1 of the ARRAY OF OPERATE TO FAILURE APPROACH COSTS (Table 2). Just subsequent to the completion of all of the operations performed at block 45 (FIG. 1), VALUE 0 through VALUE X-1 of the COST ARRAY are respectively equal to VALUE 0 through VALUE X-1 of the ARRAY OF PROGNOSTIC APPROACH COSTS (Table 3). Just subsequent to the completion of all of the operations performed at block 70 (FIG. 1), VALUE 0 through VALUE X-1 of the COST ARRAY are respectively equal to VALUE 0 through VALUE X-1 of the ARRAY OF MAINTENANCE APPROACH COSTS (Table 4).

The initialization that occurs at block 110 includes the initialization of a pointer, which is referred to herein as SECOND POINTER. SECOND POINTER is set to zero at block 110. As will be discussed in greater detail below, SECOND POINTER is incremented during the Non-Hourly Cost Calculating Operations such that SECOND POINTER is operative to sequentially identify values of the COST ARRAY. SECOND POINTER can be used to identify VALUE 0 through VALUE X-1 of the COST ARRAY. For example, VALUE [SECOND POINTER] of the COST ARRAY designates VALUE 0 of the COST ARRAY while SECOND POINTER is equal to zero. As an additional example, VALUE [SECOND POINTER] of the COST ARRAY designates VALUE X-1 of the COST ARRAY while SECOND POINTER is equal to X-1.

At block 115, other inputs to the Non-Hourly Cost Calculating Operations are initialized. The inputs to the Non-Hourly Cost Calculating Operations are as described above with reference to the High Level Operations (FIG. 1), and blocks 105 and 110, except that additional inputs include START COST, CURRENT COST, RESIDUAL COST and TOTAL COST, and at block 115 these additional inputs are initialized as follows:

START COST is set equal to the sum of EQUIPMENT MODULE COST, SPARE REPLACEMENT COST and RECURRING PROGNOSTICS COST.

SPARE REPLACEMENT COST is set equal to the product of SPARE EQUIPMENT MODULES and EQUIPMENT MODULE COST divided by NON-SPARE EQUIPMENT MODULES.

CURRENT COST is set equal to START COST.

RESIDUAL COST is set equal to START COST.

TOTAL COST is set equal to zero.

At step 120, a determination is made as to whether SECOND POINTER is less than the number of distribution points in the FAILURE PROBABILITY CURVE. In response to a positive determination at block 120, control is transferred to block 125. At block 125, a determination is made as to whether FIRST POINTER is less than MAINTENANCE INTERVAL. In response to a negative determination at block 125, control is transferred to block 130. At block 130, the sum of TOTAL COST and RESIDUAL COST is designated to be the value of TOTAL COST. At block 135, FIRST POINTER is set equal to zero. At block 140, CURRENT COST is set equal to REFURBISH FAILED EQUIPMENT MODULE COST. At block 145, RESIDUAL COST is set equal to REFURBISH FAILED EQUIPMENT COST.

Control is transferred from block 145 to block 150. Similarly, control is transferred from block 125 to block 150 in response to a positive determination at block 125. Values of the COST ARRAY are calculated at block 150. More specifically, at block 150:

VALUE [FIRST POINTER] of the COST ARRAY is set equal to (the probability that corresponds to DISTRIBUTION POINT [FIRST POINTER]) multiplied by (the sum of CURRENT COST, REFURBISH OPERATING EQUIPMENT MODULE COST, and MISSED EQUIPMENT MODULE COST)) plus FALSE COST.

MISSED EQUIPMENT MODULE COST is equal to MISSED PREDICTION PROBABILITY multiplied by (ADJUSTED FAILED REFURBISH COST minus ADJUSTED OPERATING REFURBISH COST).

ADJUSTED FAILED REFURBISH COST is equal to (REFURBISH FAILED EQUIPMENT COST plus SPARE FAILED REFURBISHMENT COST) multiplied by SCALE FACTOR.

SPARE FAILED REFURBISHMENT COST equals (REFURBISH FAILED EQUIPMENT MODULE COST multiplied by SPARES EQUIPMENT MODULES) divided by NON-SPARE EQUIPMENT MODULES.

ADJUSTED OPERATING REFURBISH COST is equal to (REFURBISH OPERATING EQUIPMENT MODULE COST plus SPARE OPERATING REFURBISHMENT COST) multiplied by SCALE FACTOR.

SPARE OPERATING REFURBISHMENT COST equals (REFURBISH OPERATING EQUIPMENT MODULE COST multiplied by SPARE EQUIPMENT MODULES) divided by NON-SPARE EQUIPMENT MODULES.

FALSE COST is equal to ADJUSTED OPERATING REFURBISH COST multiplied by FALSE WEIGHT and divided by SCALE FACTOR.

SCALE FACTOR is equal to (the time value corresponding to DISTRIBUTION POINT X-1) divided by EFFECTIVE MEAN TIME BETWEEN FAILURE.

EFFECTIVE MEAN TIME BETWEEN FAILURE is equal to MEAN TIME BETWEEN FAILURE adjusted for spares, which can be calculated using a harmonic equation. For example, HARMONIC SERIES [N] is equal to $1+\frac{1}{2}+\frac{1}{3}+\frac{1}{4}+ \ldots +1/N$. EFFECTIVE MEAN TIME BETWEEN FAILURE is equal to HARMONIC SERIES [SPARE EQUIPMENT MODULES] multiplied by MEAN TIME BETWEEN FAILURE.

FALSE WEIGHT is equal to ADJUSTED FALSE ALARM PROBABILITY multiplied by (FAILURE OPPORTUNITIES minus one) divided by the number of distribution points in the FAILURE PROBABILITY CURVE.

FAILURE OPPORTUNITIES is equal to (the time value corresponding to DISTRIBUTION POINT X-1) divided by AVERAGE OPERATIONAL CYCLE.

ADJUSTED FALSE ALARM PROBABILITY is equal to (the time value corresponding to DISTRIBUTION POINT X-1) divided by (FALSE ALARM TIME multiplied by FAILURE OPPORTUNITIES).

FALSE ALARM TIME is equal to MEAN TIME BETWEEN FAILURE divided by FALSE ALARM PROBABILITY. For example, if MEAN TIME BETWEEN FAILURE is equal to 3000 hours and FALSE ALARM PROBABILITY is 10%, then FALSE ALARM TIME is 30000 Hours.

At block 155, RESIDUAL COST is recalculated or decremented. RESIDUAL COST is equal to RESIDUAL COST minus (the probability that corresponds to DISTRIBUTION POINT [FIRST POINTER] multiplied by CURRENT COST). At block 160, a determination is made as to whether SECOND POINTER is less than the number of distribution points in the FAILURE PROBABILITY CURVE minus one. In response to a negative determination at step 160, control is transferred to block 165. At block 165 the COST ARRAY value that was most recently calculated is recalculated. More specifically, at block 165 [FIRST POINTER] of the COST ARRAY is set equal to VALUE [FIRST POINTER] of the COST ARRAY plus RESIDUAL COST.

Control is transferred from block 165 to block 170. Similarly, control is transferred from block 160 to block 170 in response to positive determination at block 160. At block 170, TOTAL COST is set equal to TOTAL COST plus VALUE [FIRST POINTER] of the COST ARRAY. At block 175, FIRST POINTER is incremented by one. At block 180, SECOND POINTER is incremented by one.

Control is transferred from block 180 to block 120. In response to a negative determination at block 120, control is transferred to block 185. At block 185, TOTAL COST and COST ARRAY are output in the manner described above with reference to the High Level Operations (FIG. 1).

Hourly Cost Calculating Operations

Figure 3:
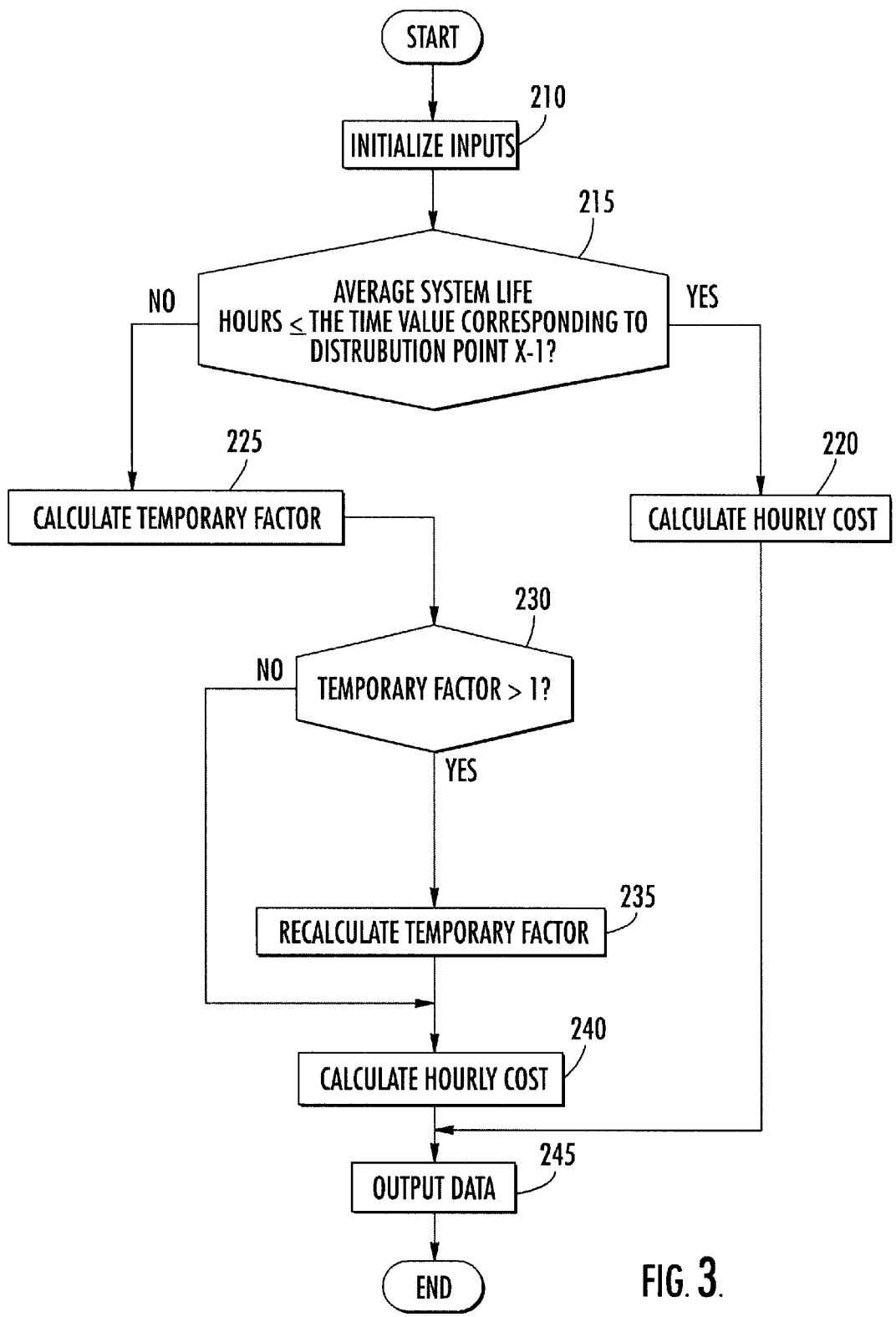
FIG. 3 presents a flow chart illustrating Hourly Cost Calculating Operations performed for calculating hourly costs from costs previously calculated from the Non-Hourly Cost Calculating Operations, in accordance with the exemplary embodiment of the present invention.

FIG. 3 presents a flow chart illustrating the Hourly Cost Calculating Operations that are performed to calculate HOURLY COST at blocks 35, 55 and 80 of FIG. 1, in accordance with the exemplary embodiment of the present invention. Referring to the Hourly Cost Calculating Operations more specifically, at block 210 of FIG. 3, inputs to the Hourly Cost Calculating Operations are initialized. The inputs to the Hourly Cost Calculating Operations are as described above with reference to the High Level Operations (FIG. 1).

At block 215, a determination is made as to whether AVERAGE SYSTEM LIFE HOURS is less than or equal to the time value corresponding to DISTRIBUTION POINT X-1. In response to a positive determination of block 215, control is transferred to block 220. At block 220, HOURLY COST is set equal to FIRST TOTAL COST divided by AVERAGE SYSTEM LIFE HOURS. In response to a negative determination at block 215, control is transferred to block 225. At block 225, TEMPORARY FACTOR is set equal to (the time value corresponding to DISTRIBUTION POINT X-1) divided by AVERAGE SYSTEM LIFE HOURS.

At block 230, a determination is made as to whether TEMPORARY FACTOR is greater than one. In response to a positive determination at block 230, control is transferred to block 235. At block 235, TEMPORARY FACTOR is set equal to AVERAGE SYSTEM LIFE HOURS divided by the time value corresponding to DISTRIBUTION POINT X-1. Control is transferred from block 235 to block 240. Similarly, in response to a negative determination at block 230, control is transferred from block 230 to block 240. At block 240, HOURLY COST is set equal to ((TEMPORARY FACTOR multiplied by FIRST TOTAL COST) plus ((one minus TEMPORARY FACTOR) multiplied by SECOND TOTAL COST)) divided by the time value corresponding to DISTRIBUTION POINT X-1. Control is transferred from blocks 240 and 220 to block 245. At block 245, HOURLY COST is output in the manner described above with reference to the High Level Operations (FIG. 1).

Maintenance Interval Calculating Operations

Figure 4:
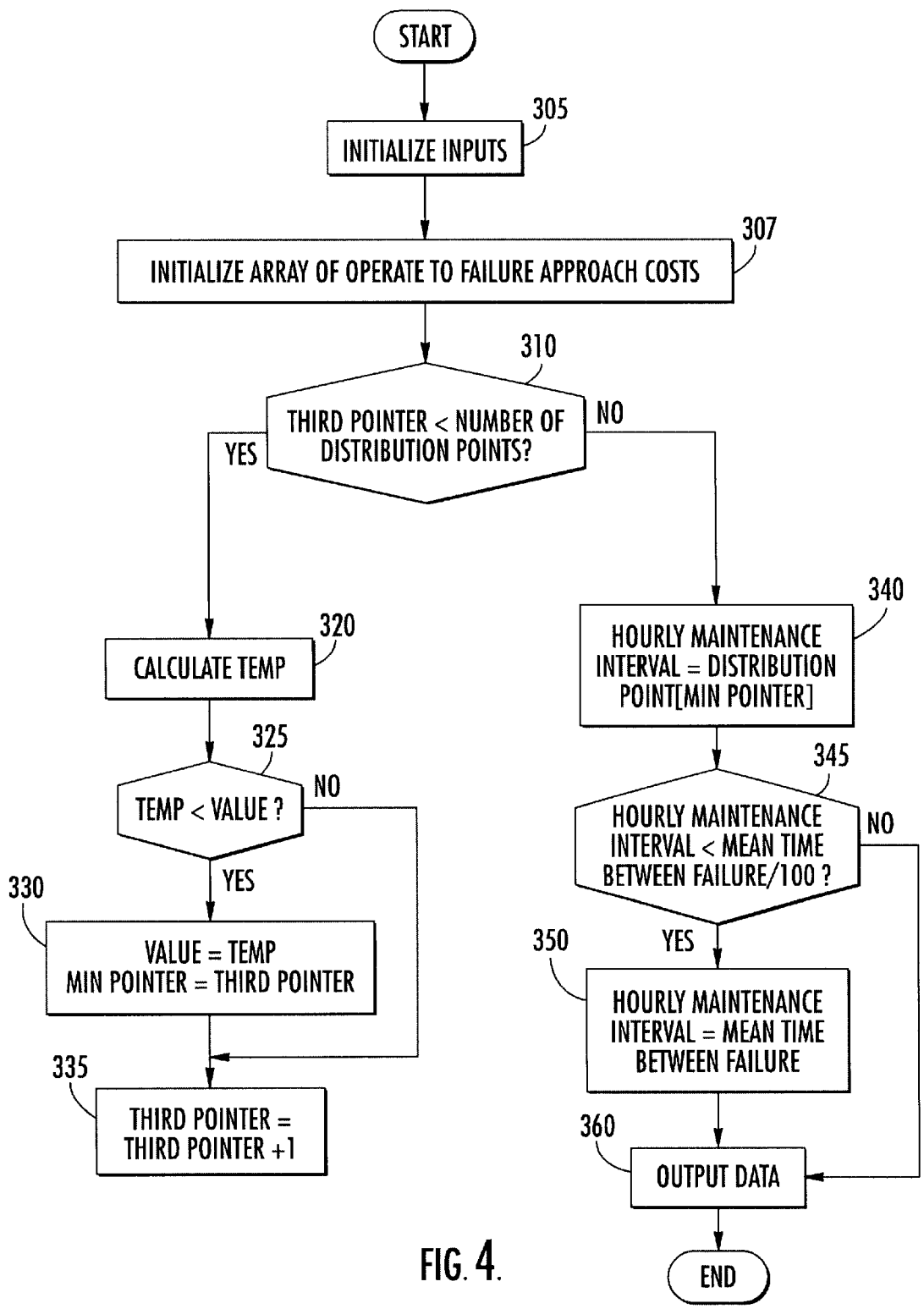
FIG. 4 presents a flow chart illustrating Maintenance Interval Calculating Operations performed for calculating a maintenance interval that is used in Non-Hourly Cost Calculating Operations performed for the Maintenance Approach, in accordance with the exemplary embodiment of the present invention.

FIG. 4 presents a flow chart illustrating the Maintenance Interval Calculating Operations that are performed to calculate MAINTENANCE INTERVAL for the Maintenance Approach Data Set illustrated by Table 3, in accordance with the exemplary embodiment of the present invention. At block 305, inputs to the Maintenance Interval Calculating Operations are initialized. Unless indicated otherwise, the inputs to the Maintenance Interval Calculating Operations are from the Maintenance Approach Data Set, except that additional inputs include VALUE, REPLACEMENT COST, SPARE REPLACEMENT COST, HOURLY MAINTENANCE INTERVAL and MIN POINTER, and at block 305 these additional inputs are initialized as follows:

- VALUE is set equal to (REPLACEMENT COST plus VALUE 0 of the ARRAY OF OPERATE TO FAILURE APPROACH COSTS) divided by the time that corresponds to DISTRIBUTION POINT 0 of the FAILURE PROBABILITY CURVE.
- REPLACEMENT COST is equal to the sum of EQUIPMENT MODULE COST and SPARE REPLACEMENT COST.
- SPARE REPLACEMENT COST is equal to the product of SPARE EQUIPMENT MODULES and EQUIPMENT MODULE COST divided by NON-SPARE EQUIPMENT MODULES.
- HOURLY MAINTENANCE INTERVAL is equal to VALUE.
- MIN POINTER is equal to zero.

At block 307, the ARRAY OF OPERATE TO FAILURE APPROACH COSTS, which is obtained from the Operate to Failure Approach Data Set illustrated in Table 2, is initialized. As should be apparent from the foregoing, the ARRAY OF OPERATE TO FAILURE APPROACH COSTS has X values that are designated VALUE 0 through VALUE X-1. The initialization that occurs at block 307 includes the initialization of a pointer, which is referred to herein as THIRD POINTER. THIRD POINTER is set to zero at block 307. As will be discussed in greater detail below, THIRD POINTER is incremented during the Maintenance Interval Calculating Operations such that THIRD POINTER is operative to sequentially identify VALUE 0 through VALUE X-1 of the ARRAY OF OPERATE TO FAILURE APPROACH COSTS. For example, VALUE [THIRD POINTER] of the ARRAY OF OPERATE TO FAILURE APPROACH COSTS designates VALUE 0 of the ARRAY OF OPERATE TO FAILURE APPROACH COSTS while THIRD POINTER is equal to zero. As an additional example, VALUE [THIRD POINTER] of the ARRAY OF OPERATE TO FAILURE APPROACH COSTS designates VALUE X-1 of the ARRAY OF OPERATE TO FAILURE APPROACH COSTS while THIRD POINTER is equal to X-1.

At block 310, a determination is made as to whether THIRD POINTER is less than the number of distribution points in the FAILURE PROBABILITY CURVE. In response to a positive determination at block 310, control is transferred to block 320. At block 320, TEMP is set equal to (REPLACEMENT COST plus VALUE [THIRD POINTER] of the ARRAY OF OPERATE TO FAILURE APPROACH COSTS) divided by the time that corresponds to DISTRIBUTION POINT [THIRD POINTER] of the FAILURE PROBABILITY CURVE.

At block 325, a determination is made as to whether TEMP is less than VALUE. In response to a positive determination at block 325, control is transferred to block 330. At block 330, VALUE is set equal to TEMP, and MIN POINTER is set equal to THIRD POINTER. Control is transferred from block 330 to block 335. Likewise, upon a negative determination at block 325, control is transferred from block 325 to block 335. At block 335, THIRD POINTER is incremented by one.

Control is transferred from block 335 to block 310. In response to a negative determination at block 310, control is transferred to block 340. At block 340, HOURLY MAINTENANCE INTERVAL is set equal to the time, in terms of hours, that corresponds to DISTRIBUTION POINT [MIN POINTER] of the FAILURE PROBABILITY CURVE. At block 345, a determination is made as to whether HOURLY MAINTENANCE INTERVAL is less than MEAN TIME BETWEEN FAILURE divided by one hundred. In response to a positive determination at block 345, control is transferred to block 350. At block 350, HOURLY MAINTENANCE INTERVAL is set equal to MEAN TIME BETWEEN FAILURE.

Control is transferred from block 350 to block 355. Likewise, upon a negative determination at block 345, control is transferred from block 345 to block 355. At block 355, MAINTENANCE INTERVAL is determined from HOURLY MAINTENANCE INTERVAL. Whereas HOURLY MAINTENANCE INTERVAL is expressed in terms of hours, MAINTENANCE INTERVAL is identified as being the distribution point of the FAILURE PROBABILITY CURVE that has an hour value that is closest to and less than the hour value of HOURLY MAINTENANCE INTERVAL. At block 360, the value of the MAINTENANCE INTERVAL is output to the Maintenance Approach Data Set illustrated by Table 3.

Benefit Calculating Operations

In accordance with the exemplary embodiment of the present invention, the method of the present invention is capable of quantifying the relative benefits of designing and operating an equipment module or system in accordance with the Operate to Failure Approach, the Prognostic Approach, and the Maintenance Approach, as well as quantifying the benefits of other options or approaches, such as incorporating spare equipment modules into a system. As such, the user can more judiciously design and operate the equipment module in accordance with the selected approach.

In accordance with a first part of the Benefit Calculating Operations, PROGNOSTIC APPROACH PAYBACK RATIO is calculated. If the value of PROGNOSTIC APPROACH PAYBACK RATIO is greater than one, then it is advantageous to incorporate the prognostics referenced by the values of the User-Defined Data Set illustrated in Table 1 into the equipment module or system referenced by the values of the User-Defined Data Set. The advantage is larger for larger values of PROGNOSTIC APPROACH PAYBACK RATIO.

More specifically, PROGNOSTIC APPROACH PAYBACK RATIO is equal to PROGNOSTIC APPROACH COSTS divided by PROGNOSTIC APPROACH SAVINGS. Unless indicated otherwise, the inputs utilized in calculating PROGNOSTIC APPROACH PAYBACK RATIO are obtained from the Prognostic Approach Data Set illustrated by Table 3, except that additional inputs are initialized as follows:

PROGNOSTIC APPROACH COSTS is equal to (ITEMS USED multiplied by RECURRING PROGNOSTICS COST) plus NON-RECURRING PROGNOSTICS COST.

ITEMS USED is equal to ITEMS HOURS divided by MEAN TIME BETWEEN FAILURE.

ITEMS HOURS is equal to (NON-SPARE EQUIPMENT MODULES plus SPARE EQUIPMENT MODULES) multiplied by TOTAL SYSTEMS PRODUCED multiplied by AVERAGE SYSTEM LIFE HOURS.

PROGNOSTIC APPROACH SAVINGS equals ((the product of NON-SPARE EQUIPMENT MODULES, TOTAL SYSTEMS PRODUCED and AVERAGE SYSTEM LIFE HOURS) multiplied by DELTA) minus NON-RECURRING PROGNOSTICS COST)

DELTA equals OPERATE TO FAILURE APPROACH HOURLY COST minus PROGNOSTICS APPROACH HOURLY COST. In accordance with an alternative embodiment of the present invention, DELTA equals MAINTENANCE APPROACH HOURLY COST minus PROGNOSTICS APPROACH HOURLY COST.

In accordance with a second part of the Benefit Calculating Operations, PROGNOSTIC COST REDUCTION is calculated. The value of PROGNOSTIC COST REDUCTION is the percent difference between OPERATE TO FAILURE APPROACH HOURLY COST and PROGNOSTIC APPROACH HOURLY COST. The advantage of incorporating prognostics is larger for larger values of PROGNOSTIC COST REDUCTION.

More specifically, PROGNOSTIC COST REDUCTION is equal to (OPERATE TO FAILURE HOURLY COST minus PROGNOSTIC APPROACH HOURLY COST) divided by OPERATE TO FAILURE APPROACH HOURLY COST. For performing this calculation, OPERATE TO FAILURE HOURLY COST is obtained from the Operate to Failure Approach Data Set, which is illustrated by Table 2, and PROGNOSTIC APPROACH HOURLY COST is obtained from the Prognostic Approach Data Set, which is illustrated by Table 3.

In accordance with a third part of the Benefit Calculating Operations, MAINTENANCE COST REDUCTION is calculated. The value of MAINTENANCE COST REDUCTION is the percent difference between the OPERATE TO FAILURE APPROACH HOURLY COST and MAINTENANCE APPROACH HOURLY COST. The advantage of incorporating maintenance practices is larger for larger values of MAINTENANCE COST REDUCTION.

More specifically, MAINTENANCE COST REDUCTION is equal to (OPERATE TO FAILURE APPROACH HOURLY COST minus MAINTENANCE APPROACH HOURLY COST) divided by OPERATE TO FAILURE APPROACH HOURLY COST. For performing this calculation, OPERATE TO FAILURE HOURLY COST is obtained from the Operate to Failure Approach Data Set, which is illustrated by Table 2, and MAINTENANCE APPROACH HOURLY COST is obtained from the Maintenance Approach Data Set, which is illustrated by Table 4.

In accordance with the exemplary embodiment of the present invention, the Benefit Calculating Operations are capable of providing numerous other calculations. For example, in accordance with a fourth part of the Benefit Calculating Operations, a benefit indicator selected from PROGNOSTIC APPROACH PAYBACK RATIO, PROGNOSTIC COST REDUCTION and MAINTENANCE COST REDUCTION, or one of the outputs identified above, such as OPERATE TO FAILURE APPROACH HOURLY COST, PROGNOSTIC APPROACH HOURLY COST, or MAINTENANCE APPROACH HOURLY COST, is calculated a first time using a first set of values for the inputs of the User-Defined Data Set illustrated in Table 1 (such that a first scenario is defined), and then the same benefit indicator or output is calculated a second time after changing the value of one or more of the inputs of the User-Defined Data Set (such that a second scenario is defined). The difference, such as the percentage difference, between the benefit indicator or output calculated the first time and the second time is calculated. That difference provides an indication of the importance of the input or inputs corresponding to the value or values that were changed between the first and second time. It may be preferable for the value of only a single input of the User-Defined Data Set to be changed between the first and second time, so that the impact of that single change can be quantified. For example, the single input for which the value is changed between the first and second calculation can be SPARE EQUIPMENT MODULES or any other of the inputs identified in the User-Defined Data Set.

Implementation of Method

In accordance with the exemplary embodiment of the present invention, a computer program product includes a computer-readable storage medium having a software module, which can be characterized as computer-readable program code means having a series of computer instructions that are embodied in the computer-readable storage medium, for facilitating the operations of the method of the present invention, which are discussed above. In this regard, FIGS. 1–4 are block diagram, flow chart and control flow illustrations of methods, systems and program products according to the invention. It will be understood that each block or step of the block diagram, flow chart and control flow illustrations, and combinations of blocks in the block diagram, flow chart and control flow illustrations, can be implemented by computer program instructions.

More specifically, in accordance with the exemplary embodiment of the present invention, all of the operations described above, except for those carried out by a user of the present invention, are preferably implemented by computer program instructions. These computer program instructions may be loaded onto a computer or other programmable apparatus to produce a machine, such that the instructions which execute on the computer or other programmable apparatus create means for implementing the functions specified in the block diagram, flow chart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flow chart or control flow block(s) or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flow chart or control flow block(s) or step(s).

Accordingly, blocks or steps of the block diagram, flow chart or control flow illustrations support combinations of means for performing the specified functions, combinations of steps for performing the specified functions and program instruction means for performing the specified functions. It will also be understood that each block or step of the block diagram, flow chart or control flow illustrations, and combinations of blocks or steps in the block diagram, flow chart or control flow illustrations, can be implemented by special purpose hardware-based computer systems which perform the specified functions or steps, or combinations of special purpose hardware and computer instructions.

Figure 5:
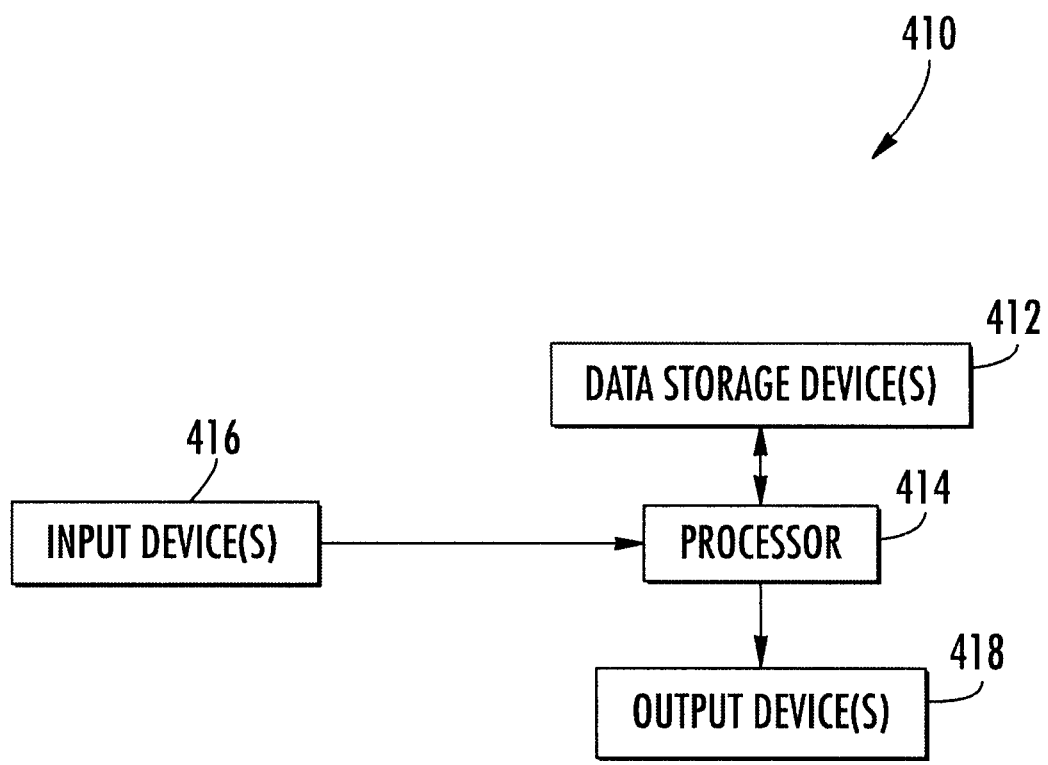
FIG. 5 diagrammatically illustrates a computer system that is capable of operating in conjunction with a software module to carry out operations of the present invention, in accordance with the exemplary embodiment of the present invention.

Those skilled in the art will appreciate that there are many different conventional programming languages that are available and that can be readily used to create the software module of the present invention. One acceptable programming language is the JAVA brand programming language. The software module of the present invention preferably operates in conjunction with a conventional computer system, an acceptable example of which is diagrammatically illustrated in FIG. 5. The computer system 410 of FIG. 5 includes one or more data storage devices 412, a processor 414, one or more input devices 416 and one or more output devices 418 that are connected and are capable of operating together in a conventional manner that is understood by those skilled in the art.

The data storage devices 412, which includes the above-discussed computer-readable storage medium, can be in the form of hard disks and drives therefor, floppy disks and drives therefor, CD ROMs and drives therefor, digital video disks and drives therefor, memory cards, or any other type of computer-readable storage medium. The processor 414 is preferably a conventional computer processor, such as a PENTIUM brand processor. The input devices 416 preferably include one or more conventional components such as, but not limited to, a keyboard, a mouse, a virtual track ball, a light pen, voice recognition equipment, or the like. The output devices 418 preferably include one or more conventional components such as, but not limited to, a display that presents images on a screen, and a printer, or the like.

The software module of the present invention preferably provides a graphical user interface via the display 418, and the graphical user interface includes multiple display screens that are presented to a user of the software module via the display 418. The display screens display information that a user has input or selected, and information that the software module outputs. A user may input information in a conventional manner via the input device 416.

Non-Limiting Example

The present invention will be further illustrated by a non-limiting example. As mentioned above, the method or software module of the present invention can operate to quantify the value of various options of designing and operating a system, and in accordance with this non-limiting example the system is an expensive aircraft, and the equipment module is an expensive bearing included in the engine of the aircraft. More specifically, FIG. 6 illustrates a FAILURE PROBABILITY CURVE for the bearing of this non-limiting example, Table 5 presents user-supplied values of inputs for this non-limiting example, and Table 6 presents values for inputs and outputs for this non-limiting example that are calculated by the method or software module of the present invention.

TABLE 5

User-Supplied Data Set

| Inputs | Value |
|---|---|
| EQUIPMENT MODULE COST | $600,000 |
| REFURBISH OPERATING EQUIPMENT MODULE COST | $30,000 |
| REFURBISH FAILED EQUIPMENT MODULE COST | %600,000 |
| OPERATIONAL FAILURE COST | $30,000,000 |
| RECURRING PROGNOSTICS COST | $500 |
| NON-RECURRING PROGNOSTICS COST | $10,000 |
| SPARE EQUIPMENT MODULES | None |
| NON-SPARE EEQUIPMENT MODULES | One |
| FALSE ALARM PROBABILITY | 10% |
| MISSED PREDICTION PROBABILITY | 10% |
| AVERAGE SYSTEM LIFE HOURS | 8,000 hours |
| AVERAGE OPERATIONAL CYCLE | 1.8 hours |
| TOTAL SYSTEMS PRODUCED | 3,000 |

TABLE 6

Calculated Data Set

| Inputs and Outputs | Value |
|---|---|
| HOURLY MAINTENANCE INTERVAL | 1,359 hours |
| OPERATE TO FAILURE APPROACH HOURLY COST | $20,481/hour |
| PROGNOSTIC APPROACH HOURLY COST | $2,135/hour |
| MAINTENANCE APPROACH HOURLY COST | $3,207/hour |
| PROGNOSTIC APPROACH PAYBACK RATIO | 54969:1 |
| PROGNOSTIC COST REDUCTION | 89% |
| PROGNOSTIC COST REDUCTION | 84% |

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for analyzing an equipment module, the method comprising:

providing an array of failure probability values for the equipment module, wherein the array of failure probability values provides an indication of the probability that the equipment module will fail at a plurality of different times; and determining a cost of operating the equipment module, comprising calculating the cost of operating the equipment module at each of the different times using the array of failure probability values, so that the cost calculated at each of the different times is proportional to the probability that the equipment module will fail at the respective time.

2. A program module stored on computer-readable medium and which, when executed by a computer, performs the method of claim 1.

3. A method for analyzing an equipment module according to claim 1, wherein:
the different times comprises a series of times;
the step of calculating the cost comprises calculating a series of first costs that respectively correspond to the series of times; and
the method further comprises identifying a maintenance time, comprising calculating a series of second costs that respectively correspond to the series of times, wherein each second cost is calculated by dividing a respective sum by the respective time corresponding to the second cost, for each second cost the respective sum includes at least the first cost that corresponds to the respective time of the second cost, and the maintenance time is the time of the series of times that corresponds to the smallest second cost of the series of second costs.

4. A program module stored on computer-readable medium and which, when executed by a computer, performs the method of claim 3.

5. A method for analyzing an equipment module according to claim 1, wherein:
the method further comprises providing a predetermined maintenance time, which indicates a time at which maintenance should be performed on the equipment module, wherein the plurality of different times comprises a series of times designated as a first time through a last time, respectively, and the maintenance time is between the first time and the last time;
the step of calculating the cost of operating the equipment module at each of the different times comprises calculating a series of costs designated as a first cost through a last cost, wherein the series of costs respectively correspond to the series of times, and the step of calculating the costs comprises calculating at least some of the costs, which correspond to times after the maintenance time, as being proportional to probabilities, which are provided by the array of failure probability values, that correspond to times prior to the maintenance time.

6. A method for analyzing an equipment module according to claim 1, further comprising providing at least one predetermined recurring cost value and at least one predetermined non-recurring cost value, wherein the step of calculating the cost of operating the equipment module at each of the different times comprises summing at least the recurring cost value and the non-recurring cost value.

7. A method for analyzing an equipment module according to claim 6, wherein:
the recurring cost value is selected from the group consisting of:
cost of the equipment module,
costs incurred due to failure of the equipment module,
costs of prognostic hardware for the equipment module, and
costs of prognostic procedures for the equipment module; and
the non-recurring cost value is selected from the group consisting of costs of designing prognostic capabilities into the equipment module.

8. A method for analyzing an equipment module according to claim 1, further comprising providing a predetermined probability value, wherein the step of calculating the cost of operating the equipment module at each of the different times comprises using the predetermined probability value to calculate a product.

9. A method for analyzing an equipment module according to claim 8, wherein the predetermined probability value is selected from the group consisting of:
a probability that the equipment module will be incorrectly identified as needing to be refurbished;
a probability that the equipment module will be incorrectly identified as needing to be replaced;
a probability that no notification of a necessary refurbishment will be provided for the equipment module, such that the equipment module fails without warning; and
a probability that no notification of a necessary replacement will be provided for the equipment module, such that the equipment module fails without warning.

10. A method according to claim 1, further comprising:
specifying a first scenario of operating the equipment module, wherein the determining a cost of operating the equipment module comprises determining a cost of operating the equipment module in accordance with the first scenario, and the calculating the cost of operating the equipment module at each of the different times using the array of failure probability values comprises calculating the cost of operating the equipment module in accordance with the first scenario at each of the different times using the array of failure probability values, so that the cost calculated at each of the different times for the first scenario is proportional to the probability that the equipment module will fail at the respective time;
specifying a second scenario of operating the equipment module, wherein the second scenario is different from the first scenario;
determining a cost of operating the equipment module in accordance with the second scenario, comprising calculating the cost of operating the equipment module in accordance with the second scenario at each of the different times using the array of failure probability values, so that the cost calculated at each of the different times for the second scenario is proportional to the probability that the equipment module will fail at the respective time; and
determining a first value that quantifies the difference between the cost of operating the equipment module in accordance with the first scenario and the cost of operating the equipment module in accordance with the second scenario.

11. A program module stored on computer-readable medium and which, when executed by a computer, performs the method of claim 10.

12. A method according to claim 10, wherein the first and second scenarios are selected from a group consisting of an operate to failure approach, a prognostic approach, and a maintenance approach.

13. A method according to claim 10, wherein both the first and second scenarios are defined by at least one variable, and the specifying of the first scenario comprises specifying a first value for the variable and the specifying of the second scenario comprises specifying a second value for the variable that is different from the first value.

14. A program module stored on computer-readable medium and which, when executed by a computer, performs the method of claim 13.

15. A method according to claim 13, wherein the variable is selected from a group consisting of:

cost of the equipment module;

costs incurred due to failure of the equipment module;

number of equipment modules;

total amount of time that a system incorporating the equipment module is expected to operate in the entire life of the system;

average length of time that the system incorporating the equipment module operates, wherein the system operates intermittently; and total number of the systems that will be produced.

16. A method according to claim 10, wherein each of the first and second scenarios comprises a prognostic approach which is defined by at least one variable, and the specifying of the first scenario comprises specifying a first value for the variable and the specifying of the second scenario comprises specifying a second value for the variable that is different from the first value.

17. A method according to claim 16, wherein the variable is selected from a group consisting of:

cost of prognostic hardware for the equipment module;

cost of prognostic procedures for the equipment module;

cost of designing prognostic capabilities into the equipment module;

a probability that the equipment module will be incorrectly identified as needing to be refurbished;

a probability that the equipment module will be incorrectly identified as needing to be replaced;

a probability that no notification of a necessary refurbishment will be provided for the equipment module, such that the equipment module fails without warning; and a probability that no notification of a necessary replacement will be provided for the equipment module, such that the equipment module fails without warning.

18. A method according to claim 10, further comprising:

specifying a third scenario of operating the equipment module;

specifying a fourth scenario of operating the equipment module, wherein the third scenario is different from the fourth scenario;

determining a cost of operating the equipment module in accordance with the third scenario, comprising calculating the cost of operating the equipment module in accordance with the third scenario at each of the different times using the array of failure probability values, so that the cost calculated at each of the plurality of different times for the third scenario is proportional to the probability that the equipment module will fail at the respective time;

determining a cost of operating the equipment module in accordance with the fourth scenario, comprising calculating the cost of operating the equipment module in accordance with the fourth scenario at each of the different times using the array of failure probability values, so that the cost calculated at each of the plurality of different times for the fourth scenario is proportional to the probability that the equipment module will fail at the respective time;

determining a second value that quantifies the difference between the cost of operating the equipment module in accordance with the third scenario and the cost of operating the equipment module in accordance with the fourth scenario; and quantifying the difference between the first value and the second value.

19. A program module stored on computer-readable medium and which, when executed by a computer, performs the method of claim 18.

20. A method according to claim 18, wherein each of the first, second, third and fourth scenarios are defined by at least one variable, and the specifying of the first and second scenarios comprises specifying a first value for the variable and the specifying of the third and fourth scenarios comprises specifying a second value for the variable that is different from the first value.

* * * * *